July 16, 1946.  A. C. STALEY  2,404,323
SUPERCHARGER CONTROL APPARATUS
Filed Jan. 1, 1942
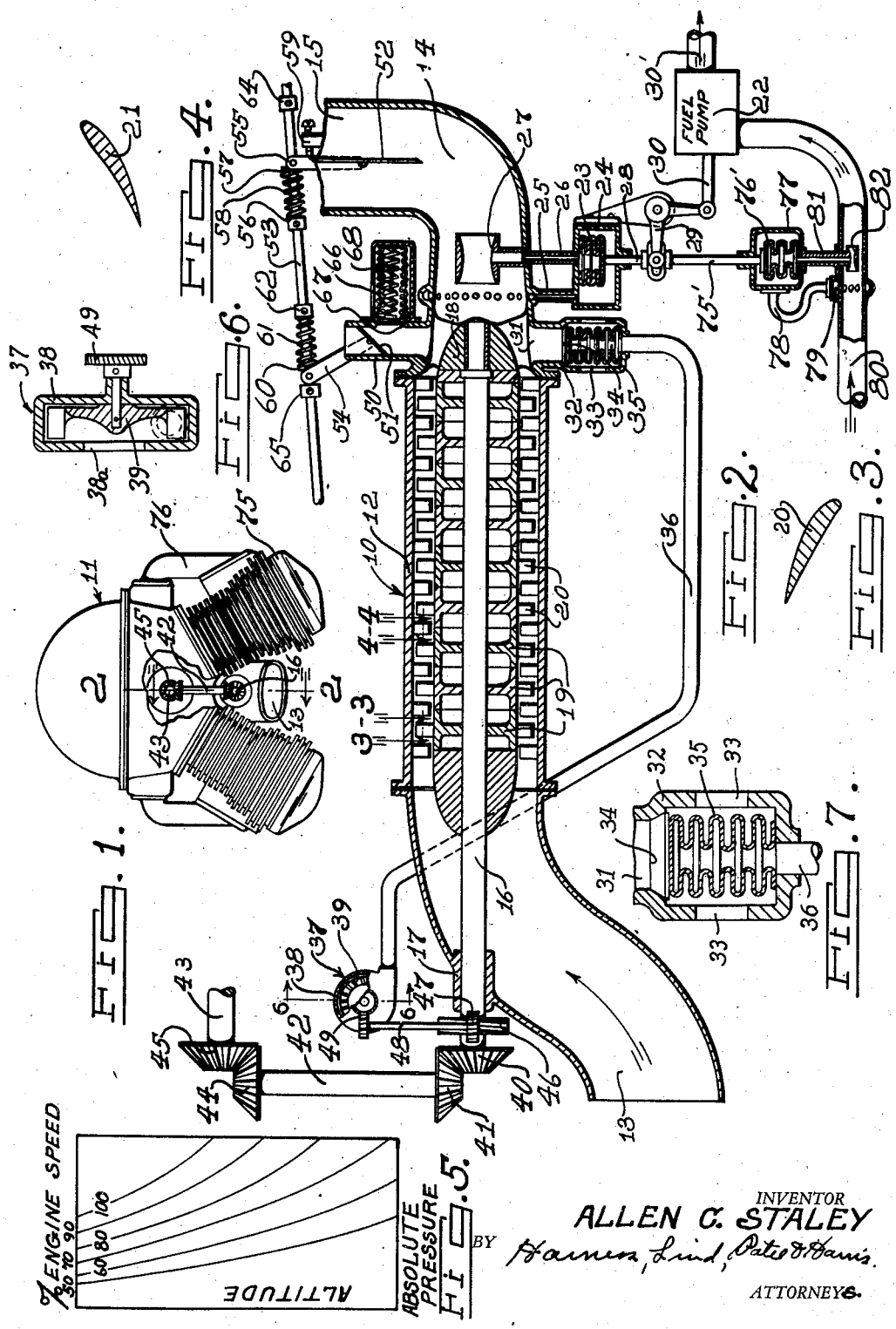
INVENTOR
ALLEN C. STALEY
BY Harness, Lind, Pates & Harris
ATTORNEYS.

Patented July 16, 1946

2,404,323

UNITED STATES PATENT OFFICE 2,404,323

SUPERCHARGER CONTROL APPARATUS

Allen C. Staley, Birmingham, Mich., assignor to Chrysler Corporation, Highland Park, Mich., a corporation of Delaware Application January 1, 1942, Serial No. 425,298

12 Claims. (Cl. 123—119)

This invention relates to an improved control apparatus for superchargers and associated fuel system for internal combustion engines.

More specifically, the invention pertains to an improved control apparatus of this kind which is particularly adapted for superchargers of aircraft engines.

It is well known that axial flow as well as other superchargers stall when the relation of the density and volume of the air entering the inlet of the supercharger to the discharge pressure is not maintained within predetermined limits. The limiting discharge pressure, above which aero-dynamic stalling will occur, decreases in value as the inlet air density decreases. For each fixed speed of operation of a given supercharger, the limiting discharge pressure follows a curve, during variation of inlet air density, which can be determined experimentally and which is known as the pumping limit curve of the supercharger. Since, in the operation of an aircraft having an engine provided with a supercharger, changes in inlet air density occur with changes in altitude and temperature, discharge pressure-altitude pumping limiting curves, such as those shown in Fig. 5, may conveniently be relied upon to establish the limiting discharge pressure above which stalling will occur while operating at various speeds and at diverse altitudes.

One of the main objects of the invention is the provision of control apparatus for automatically holding the discharge pressure of a supercharger below the pumping limit of the supercharger under conditions of varying speed and varying inlet air densities such as result from variations in the altitude and temperatures at which it is operated.

A further object of the invention is to provide at the discharge end of a supercharger of this kind, a spill valve which tends to open under the discharge pressure for variably limiting the latter by reducing the pressure and increasing the volume of the air handled at diverse speeds and inlet air densities such as result from changes in altitude at which operation occurs.

A still further object of the invention is to provide mechanism which is responsive to both inlet air density and operative speed of the supercharger for so automatically variably opposing opening of the pumping limit control spill valve as to maintain the discharge pressure, throughout a wide range of speeds and inlet air densities, below different predetermined values corresponding to the speed and inlet air density above which stalling of the supercharger would occur.

Other objects of the invention are to provide an air compressing unit for creating the variable force required to oppose opening of the spill valve under diverse operating conditions which is subjected to substantially the same inlet air density as the supercharger and which is operated at a speed directly proportional thereto and to provide an air compressing unit for this purpose having characteristics such that the variation of the speed at which it is driven and the variation of the density of the air at its inlet produce such changes in the force developed thereby and opposing opening of the spill valve as to limit the discharge pressure of the supercharger to a value below that at which the latter would stall at each speed of operation and in that air density respectively within relatively wide ranges of speeds and air inlet densities and without holding the supercharger discharge pressure at unnecessarily low value at any speed or inlet air density within said ranges.

Additional objects of the invention are to provide improved manually operable control means for a supercharger by which the engine with which the latter is associated can be throttled; to provide a manually operable spill valve and a manually operable throttle valve in control means of this kind for reducing the supply of air from the supercharger to the engine by exhausting a portion of such air and by obstructing the air flow to the engine respectively; to provide a control system for the above mentioned valves which is interconnected with each thereof and adapted to sequentially operate the valves in a predetermined order; and to provide a control system of this kind which, in reducing the supply of air to the engine from a maximum value, initially opens the manually operable spill valve and subsequently closes the throttle valve and which, in decreasing the air supply, initially opens the throttle valve and subsequently closes the spill valve.

Still further objects of the invention are to provide mechanism in the outlet of a supercharger for controlling the fuel weight regulating means of a liquid fuel injection pump in response to the weight of air supplied by a supercharger to an engine; and to provide mechanism of this kind which is so located with respect to the outlet of the supercharger as to be responsive to only that portion of the air operated upon by the supercharger which is actually supplied to the engine.

An illustrative embodiment of the invention is shown in the accompanying drawing, in which:

Fig. 1 is an end elevational view of an internal combustion engine having a supercharger and control apparatus therefor embodying the invention.

Fig. 2 is a fragmentary central sectional view of the supercharger taken on the line 2—2 of Fig. 1.

Fig. 3 is a transverse sectional view of one of the blades of the rotor of the supercharger taken on the line 3—3 of Fig. 2.

Fig. 4 is a sectional view of one of the stationary blades taken on the line 4—4 of Fig. 2.

Fig. 5 discloses typical pressure altitude pumping limit curves of a supercharger of the axial flow type.

Fig. 6 is a sectional view taken on the line 6—6 of Fig. 2.

Fig. 7 is an enlarged sectional view of the spill valve and control therefor.

In the form of the invention illustrated in the drawing, the improved supercharger control apparatus embodying the invention is illustrated, as applied to a supercharger, generally designated by the numeral 10, of the axial flow type which is illustrated in connection with an internal combustion engine generally designated by the numeral 11 suitable for propelling aircraft and of the type which has a fuel system injecting fuel into the engine manifold or the engine cylinders.

The supercharger 10 comprises a casing 12 having an air inlet 13 at one end and a discharge chamber and air outlet 14 and 15 respectively at its opposite end. Extending centrally through the casing 12 is a shaft 16 journalled in suitable bearings 17 and 18 and on which are fixed a series of air propelling elements 19 each provided with fan blades 20. The fan blades 20 of successive air propelling units 19 are of such shape and pitch as to progressively increase the pressure of the air passing from the inlet 13 to the discharge chamber 14 in successive steps. Fixed blades 21 carried by the casing 12 are disposed between blades of successive air propelling units 19 in order to properly direct the air propelled by the blades of one unit for further propulsion of the next successive unit.

Air under pressure delivered by the final air propelling unit 19 is received in the discharge chamber 14 from which it flows through the outlet 15 to the manifold of the engine 11.

The weight of liquid fuel supplied to the engine is proportioned with respect to the weight of air fed thereto from the supercharger by suitably controlling the discharge of liquid fuel from a variable liquid fuel pump of conventional construction, generally designated by the numeral 22. The control apparatus by which this is accomplished comprises a bellows 23 contained in a casing 24, the interior of which is connected by a pipe 25 with the interior of the discharge chamber 14 so as to maintain pressure in the casing 24 proportional to the air pressure in the discharge chamber 14. The interior of the bellows 23 is connected by a pipe 26 with the Venturi tube 27 disposed centrally of the passage through the discharge chamber 14 in order to subject the interior of the bellows to pressure changes in proportion to changes in velocity of air flow through the discharge chamber and to the engine. The Venturi tube is so located as to be responsive only to that portion of the air operated upon by the supercharger which is actually fed to the engine. The bellows 23 is mechanically connected with a stem 28 attached to the bellows 23 and to a bellcrank 29 which is in turn connected with a control rod 30 by which the quantity of fuel discharge of the pump is variably regulated. Fuel discharged from the pump 22 is supplied to the engine by a conduit 30' which may be connected to an injection nozzle (not shown) arranged to discharge fuel directly into the cylinder heads 75 or into the intake manifold 76 of the engine.

Since the pressure applied in regulating the pump 22 through the bellows 23 is a function of the square of the air velocity in the discharge passage 14, there is a tendency to increase the fuel supply in response to air flow at a greater rate than that desired. This is avoided by variably opposing the action of the bellows 23 upon the bellcrank 29 by the action of a rod 75' which is attached at one end to a bellows 76' confined in a chamber 77 and to the bellcrank 29 at its opposite end. The interior of the chamber 77 is connected by a conduit 78 with a static pressure chamber 79 which communicates with the fuel line 80 leading to the inlet side of the pump 22. The interior of the bellows 76' is connected by a conduit 81 with a venturi 82 arranged concentrically of the fuel line 80. The venturi 82 subjects the interior of the bellows to changes of pressure in proportion to the fuel flow through the conduit 80. The bellows 76' thus acts to reduce the fuel increasing action produced by the bellows 23 as to prevent the fuel-air ratio from excessively increasing with increased air flow. This control mechanism is therefore predetermined to maintain a fuel-air ratio as demanded by engine requirements under a wide range of operating conditions.

Privide at the inlet end of the discharge chamber 14 is an exhaust outlet 31 leading to the interior of a casing 32 and having an opening 33 communicating with atmosphere. The wall of the casing 32 has a valve seat against which a valve 34 bears. The valve 34 is normally held in closed position by a bellows 35 to the interior of which air under pressure is supplied through a conduit 36. The air supplied through the conduit 36 is impelled by a pilot blower generally designated by the numeral 37 which includes a casing 38, an inlet 38a, and rotor 39. The rotor 39 is driven in timed relation to operation of the supercharger which may be driven in timed relation to the crankshaft of the engine 11. The supercharger also may be driven in any manner from any suitable power source but for purposes of illustration the drawing shows a drive for the supercharger comprising meshed bevelled gears 40 and 41 on the supercharger shaft 16 and on an intermediate driving shaft 42 respectively. The intermediate shaft 42 is drivingly connected with the crankshaft 43 of the engine by bevelled gears 44 and 45. Mounted on the shaft 16 of the supercharger is a worm 46 which is meshed with a worm gear 47 on the lower end of a shaft 48. The upper end of the shaft 48 is drivingly connected to the rotor 39 of the pilot air compressor by suitable gearing 49.

Opening of the pumping limit control spill valve 34 is thus variably opposed by the discharge pressure of the pilot compressor 37 which in turn varies in accordance with both the speed of operation of the supercharger and with variations in the density of the air supplied to the pilot compressor. The pilot compressor is of such construction that during all speeds at which it is driven it operates well within its pumping or surging limit. The pilot compressor may comprise an axial flow or centrifugal type blower, the output of which is predetermined by its construction to so variably oppose opening of the pumping limit spill valve 34 as to prevent the discharge pressure of the supercharger 10 from exceeding that value at which aero-dynamic stalling occurs throughout relatively wide correlated ranges of operating speeds and inlet air densities. This is accomplished without unnecessarily limiting the discharge pressure far below its pumping limit during any operating conditions.

The inlet end of the discharge chamber 14 is provided with a second exhaust passage 50 in which is disposed a valve 51 for variably obstructing the escapement of air from the pressure chamber 14. The outlet 15 of the discharge chamber 14 is provided with a throttle valve 52. The valves 51 and 52 may be manually regulated for changing the supply of air to the engine by a common actuating rod 53 which is shiftably mounted in supporting structure (not shown). The valves 51 and 52 are operatively connected by operating levers 54 and 55 respectively with the control rod 53 in such manner that when the throttle valve 52 is fully opened as illustrated in Fig. 2, the escapement valve 51 is fully closed. This is accomplished by providing on the rod 53 a collar 56 and a shiftable abutment 57 between which is disposed a coil spring 58. The coil spring 58 urges the shiftable abutment 57 against the operating lever 55 of the valve 52 when the control rod 53 is in the position shown in Fig. 2 thereby holding the lever 55 against a stop 59 and retaining the throttle valve 52 in open position. The escapement valve 51 is similarly held in closed position under the above conditions by a shiftable abutment 60 which is urged leftwardly as viewed in Fig. 2 by a coil spring 61 bearing against the collar 62 on the rod 53. Provided on the rod 53 is a fixed abutment 64 which is spaced rightwardly, as viewed in Fig. 2, from the shiftable abutment 57 in order to allow lost motion action between the control lever 55 and the rod 53 during leftward movement of the latter as viewed in Fig. 2. A similar abutment 65 is provided on the rod in spaced relation to the shiftable abutment 60 in order to allow lost motion action between the rod 53 and the operating lever 54 of the escapement valve 51 when the rod 53 is shifted rightwardly as viewed in Fig. 2.

In the foregoing control apparatus, when the maximum supply of air is being fed to the engine, the escapement valve 51 is closed and the throttle valve 52 is fully opened as illustrated in the drawing. In this position the spring 58 is compressed, and the abutment 64 is spaced rightwardly of the lever 55. The control rod 53 is in an extreme right position. Movement of the rod 53 to the left causes the collar 62 to be moved to the left, the collar 62 acting through the spring 61 to move the abutment 60 to the left. This causes the lever 54 to be rotated counter-clockwise, and the valve 51 to be moved to open position. The abutment 65 also moves to the left with the rod 53, thereby permitting the above to happen. In the meantime the abutment 64 has been moving to the left and has finally reached the lever 55 but has not moved the lever 55 counter-clockwise so as to disturb the open position of the valve 52. The collar 56 has also moved to the left, but the spring 58, because of its expansion from a compressed state, maintains the abutment 57 in engagement with the lever 55, thereby maintaining the open condition of the valve 52. Thus the rod 53 is in an intermediate position, and both valve 51 and valve 52 are open. Opening of the valve 51 decreases the flow of air to the engine past the open valve 52. Further movement of rod 53 to the left causes further movement to the left of abutment 64, and since this abutment is now in engagement with lever 55, counter-clockwise movement of the lever 55 and valve 52 takes place with the valve 52 reaching closed position. A stop, not shown, prevents movement of the valve 51 beyond open position. The abutment 65 moves to the left away from the lever 54. The abutment 62 also moves to the left, but this is possible because the spring 51 can be and is compressed. The rod 53 has now reached an extreme left position, in which the valve 52 is closed, and the valve 51 is open. Thus the supply of air to the engine is further reduced, not only because the valve 51 is open, but also because the valve 52 now obstructs passage of air to the engine.

In order to prevent the discharge air pressure from exceeding a selected value under any operating conditions, a safety valve 66 is provided in an opening 67 formed in the wall of the exhaust passage 50. The valve 66 is normally held in closed position by a spring 68 and is adapted to open under the discharge pressure when the latter exceeds a selected value.

Although but one specific embodiment of the invention is herein shown and described, it will be apparent that various changes in the size, shape and arrangement of parts may be made without departing from the spirit of the invention.

What is claimed is:

1. In a supercharger for supplying air to an internal combustion engine; apparatus for maintaining operation of said supercharger within its pumping limit throughout relatively wide ranges of operating speeds and inlet air densities respectively including a spill valve for discharging air to atmosphere subjected on one side to and adapted to be opened by the discharge pressure of said supercharger, and means responsive to changes in both the speed of operation of said supercharger and the air density in the vicinity of its air inlet for variably urging said valve toward its closed position with a force varying directly in accordance with speed and directly with respect to inlet air density.

2. In a supercharger for supplying air to an internal combustion engine; apparatus for maintaining operation of said supercharger within its pumping limit throughout relatively wide ranges of operating speeds and inlet air densities respectively including a spill valve subjected on one side to and adapted to be opened by the discharge pressure of said supercharger, and means responsive to changes in both the speed of operation of said supercharger and its inlet air density for variably urging said valve toward its closed position with a force varying in accordance with speed and inlet air density, said means including an air pressure responsive element operating on the other side of said valve, a pilot air compressor having an air inlet subjected to substantially the same air density as the air inlet of said supercharger and having a discharge outlet connected with said element and mechanism for driving said pilot air compressor in timed relationship with respect to said supercharger.

3. In a supercharger for supplying air to an internal combustion engine; apparatus for maintaining the discharge pressure of said supercharger within the limits of a definite predetermined pumping limit curve throughout a substantially wide range of inlet air densities for each of a plurality of operating speeds of said supercharger including a spill valve subjected on one side to and adapted to be opened by the discharge pressure of said supercharger, means responsive to both the speed of operation of said supercharger and its inlet air density for variably opposing opening of said spill valve including a pilot air compressor driven in timed relation to said supercharger and an air chamber connected with the discharge thereof for applying a valve closing force on the opposite side of said spill valve.

4. In a supercharger for supplying air to an internal combustion engine; apparatus for maintaining the discharge pressure of said supercharger within the limits of a definite predetermined pumping limit curve throughout a substantially wide range of inlet air densities for each of a plurality of operating speeds of said supercharger including a spill valve subjected on one side to and adapted to be opened by the discharge pressure of said supercharger, means responsive to both the speed of operation of said supercharger and its inlet air density for variably opposing opening of said spill valve including a pilot air compressor driven in timed relation to said supercharger and an air chamber connected with the discharge thereof for applying a valve closing force on the opposite side of said spill valve, said air compressor being so constructed and drivingly connected with said supercharger as to operate well within its pumping limit throughout the operating range of said supercharger and throughout the variations of the inlet air density to which it is subjected in normal operation.

5. In a supercharger for supplying air to an internal combustion engine of an aircraft; apparatus for maintaining the discharged pressure of said supercharger within the limits of a definite predetermined pumping limit curve during operation at a substantially wide range of altitudes including a valve for exhausting air from the discharge side of said supercharger adapted to be opened by discharge pressure, and mechanism for urging said valve toward closed position with force of variable magnitude, said mechanism being so constructed and arranged as to vary said force inversely with respect to variations in altitude and directly with respect to variations in speed of operation of said compressor.

6. In a supercharger having a discharge chamber provided with a main outlet for supplying air to an internal combustion engine and an escapement outlet for discharging air to atmosphere, mechanism for controlling the supply of air to said engine including a valve in said main outlet, a valve in said escapement outlet, and control apparatus for opening and closing said valves in predetermined sequence, said control apparatus being so constructed and arranged as to initially positively open said escapement valve and subsequently close said main valve during reduction of the supply of air to said engine from a maximum to a minimum value and to initially open said main valve and subsequently positively close said escapement valve during increasing of the supply of air to said engine from a minimum to a maximum value.

7. In a supercharger having a discharge chamber provided with a main outlet for supplying air to an internal combustion engine and an escapement outlet, mechanism for controlling the supply of air to said engine including a valve in said main outlet, a valve in said escapement outlet, a common shiftable control rod for actuating said valves and means operatively connecting said rod with said main outlet and escapement valves respectively including a valve operating lever associated with each valve and spaced yieldable and fixed elements on opposite sides of each of said levers respectively, said yieldable abutments being adjacent each other and adapted to accommodate movement of each lever by its associated fixed abutment while the other lever remains at rest during movement of said rod in respectively opposite directions throughout a predetermined portion of its range of movement.

8. The method of maintaining operation of a supercharger for an internal combustion engine within its pumping limit which consists in variably discharging air to atmosphere from the discharge chamber of said supercharger, and variably opposing such discharge of air automatically in accordance with variations in the inlet air density and speed of operation of said supercharger by the force of a source of air pressure varying in pressure directly with respect to variations in speed of operation of said supercharger and inversely with respect to variations in the altitude at which it is operated.

9. A fuel and air charging system for an internal combustion engine comprising a variable liquid fuel pump having a control member for predetermining the weight of fuel discharged therefrom, an axial flow supercharger having an air inlet and a compressed air outlet communicating with said engine and including pressure and pumping limit control mechanism having air spilling outlets spaced on the up stream side of said compressed air outlet, and apparatus for actuating said fuel pump control member including an element responsive to air condition and located in the air stream propelled by said supercharger between said air spilling outlets and said compressed air outlets, said element being subjected to the action of only that portion of the air operated upon by said supercharger which is discharged from said compressed air outlet.

10. A fuel and air charging system for an internal combustion engine comprising a variable liquid fuel pump having a control member for predetermining the weight of fuel discharged therefrom, an axial flow supercharger having an air inlet and a compressed air outlet communicating with said engine, mechanism for controlling the supply of air from said compressed air outlet comprising a variable throttle valve in said outlet and a variable air spilling outlet spaced on the up stream side from said compressed air outlet, and apparatus for actuating said fuel pump control member including an element responsive to air conditions and located between said air spilling outlet and said compressed air outlet, said element being subjected to the action of that portion only of the air operated upon by said supercharger which is discharged from said compressed air outlet.

11. A fuel and air charging system for an internal combustion engine comprising a variable liquid fuel supply system having a control member for predetermining the weight of fuel discharged therefrom, a supercharger having an air inlet and a compressed air outlet communicating with said engine, mechanism for controlling the supply of air from said compressed air outlet comprising a variable throttle valve in said outlet and an air spilling outlet spaced on the upstream side from said compressed air outlet, and apparatus for actuating said fuel system control member including an element responsive to air conditions at a location between said air spilling outlet and said compressed air outlet, said element being subjected to the action of that portion only of the air operated upon by said supercharger which traverses said location.

12. The method of maintaining operation of a supercharger for an internal combustion engine within its pumping limit which consists in variably discharging air to the atmosphere from the discharge chamber of said supercharger, and variably opposing such discharge of air automatically and directly with variations in the inlet air density and directly with variations in speed of operation of said supercharger.

ALLEN C. STALEY.